Figure 4:
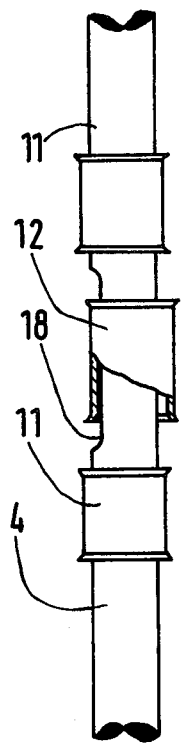

United States Patent [19]

Lilja

[11] 4,057,287
[45] Nov. 8, 1977

[54] SUN SHADE FOR MOTOR VEHICLE

[76] Inventor: Harry L. Lilja, Solhem 5102, S-443 00 Lerum, Sweden

[21] Appl. No.: 698,873

[22] Filed: June 23, 1976

[30] Foreign Application Priority Data

June 25, 1975 Sweden .............................. 7507284

[51] Int. Cl.² .............................................. B60J 3/00
[52] U.S. Cl. .................... 296/97 K; 16/128 R
[58] Field of Search .................... 296/97 K, 97 H; 16/128 R

[56] References Cited

U.S. PATENT DOCUMENTS

| | | | |
|---|---|---|---|
| 2,628,125 | 2/1953 | Jacobs | 296/97 K |
| 3,472,549 | 10/1969 | Weisman | 296/97 K |
| 3,910,627 | 10/1975 | Meyer | 296/97 K |

Primary Examiner—Philip Goodman

[57] ABSTRACT

Sunshade, intended for use in motor vehicles and substantially comprising a light-shielding unit. Said unit is arranged to be pivotally suspended in a fixed portion of the vehicle by means of a hinge, which substantially comprises a rod-shaped shaft part and a sleeve-shaped part. One of said parts is anchored to said fixed portion of the vehicle and the other is rigidly connected with the shielding unit. Said two parts are pivotally connected each other by a suitably chosen frictional force. The sleeve-shaped part has at least one sleeve-portion, which tends to occupy a position radially displaced relative to the principal pivoting axis of the hinge.

4 Claims, 8 Drawing Figures

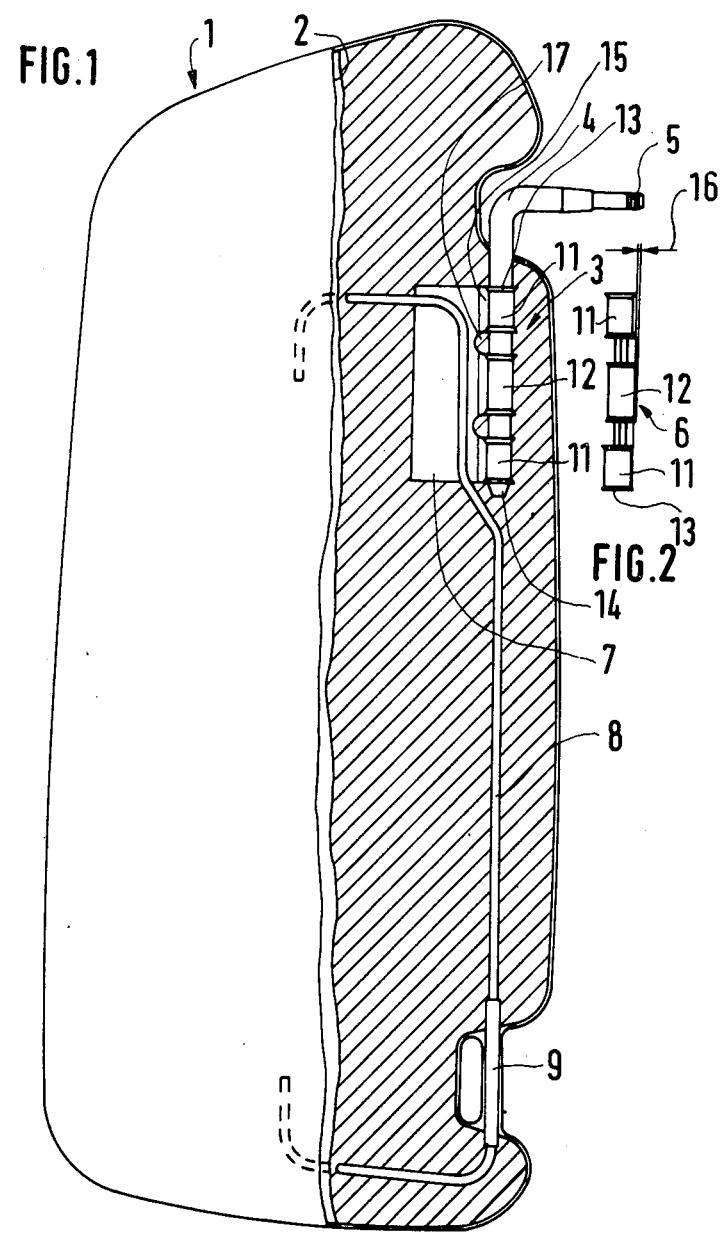

SUN SHADE FOR MOTOR VEHICLE

The present invention relates to a sunshade intended for use in motor vehicles and substantially comprising a light shielding unit, which is arranged to be pivotally suspended in a fixed portion of the vehicle by means of a hinge, which substantially is composed of a rod-shaped shaft-part and a sleve-shaped part, one of said parts being anchored to said fixed portion of the vehicle and the other being rigidly connected with the shielding unit. The two parts being pivotably connected to each other with a suitably chosen frictionally force.

Sunshades for motor vehicles are usually designed as pivotable shades suspended in a fixed part of the vehicle, and when not in use, usually swung up against the roof of the vehicle. In order to make sure that the sunshade is retained in this position not giving rise to the risk that all of a sudden it is swung downwardly obstructing the view of the driver, the sunshades generally are made in such a way that pivoting can take place against a suitably chosen friction force, which thus is adjusted in such a manner that a pivoting down of the sunshade by hand can be performed in a convenient while at the same time preventing unintentional downward pivoting of the same due to its own weight, vibrations, and shaking of the vehicle.

This problem has been solved in the prior art by providing the hinge, by means of which the sunshade is suspended in a pivotable mounting, with a pinching means comprising a setting screw, which is accessible from the outside in order to permit tightening, when the friction proves to be too low on account of wear. However, this design has turned out to be too expensive and complicated. Moreover even though there has been a need for readjustment, the setting screw generally never is used on account of a lack of knowledge about its function.

It is an object of the present invention to provide a sunshade at low cost and having a simple hinge, which meets high requirements with respect to the conservation of a chosen degree of friction over a maximum length of time.

The object mentioned is achieved by means of a sunshade according to the present invention which is characterized by the sleve-shaped part, having at least one sleeve-portion, which tends to occupy a position radially displaced relative to the principal pivoting axis of the hinge.

Figure 5:
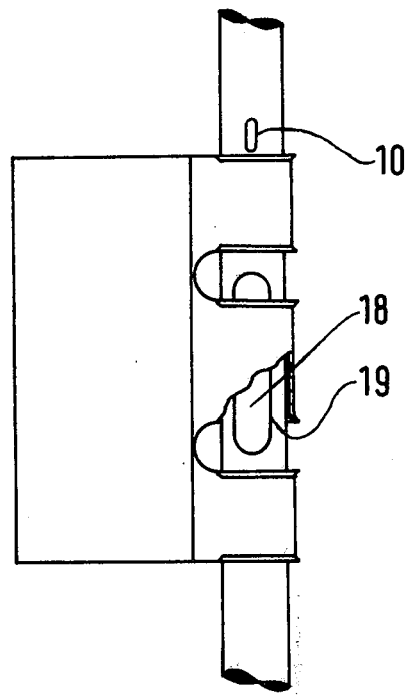
Figure 3:
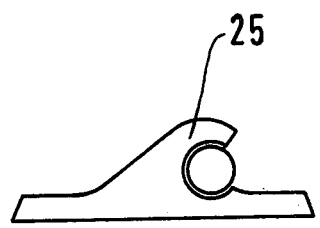
Figure 6:
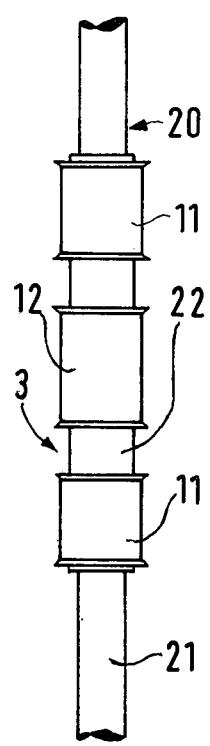
Figure 7:
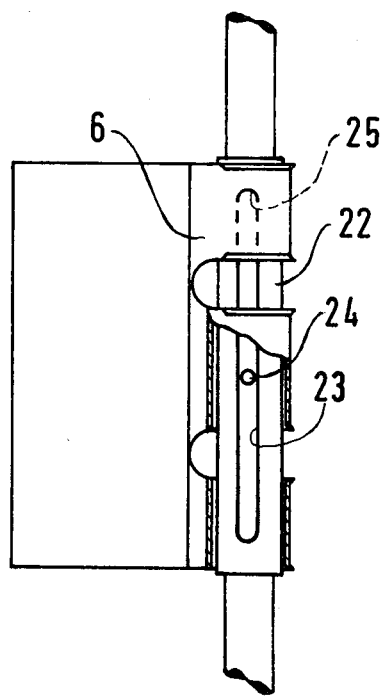
Figure 8:
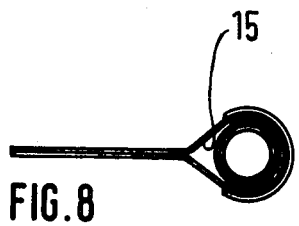

The invention will now be described more in detail in the following embodiments, reference being made to the accompanying drawings, in which FIG. 1 is a view partly in action of a sunshade according to the present invention, FIG. 2 is a view of a detail of a hinge forming part of the sunshade, FIG. 3 is a view on an enlarged scale of a detail of a member for the suspension of the sunshade, FIGS. 4 and 5 are partial views of the hinge as seen at right angles to each other, the embodiment having a member for holding the sunshade in a predetermined pivoting postion, while the FIGS. 6 and 7 are corresponding partial views of the hinge in an embodiment, which permits a sidewise displacement of the sunshade, and FIG. 8 is a rear view of the hinge illustrated in FIGS. 6 and 7.

The sunshade illustrated in FIG. 1 comprises a light-shielding unit 1, which may be made of polyurethane by sponge moulding, in connection wherewith the frame structure is provided with a cover in the form of by way of example a plastic foil 2. The shielding unit 1 is further provided with a hinge 3, by means of which it is intended to be pivotably mounted in the vehicle at some fixed part of the same. The hinge 3 comprises a rod-shaped shaft portion 4, which at its free end 5 is intended to be fixed to the vehicle, and a sleeve-shaped portion 6, which is rigidly connected to the shielding unit 1. The sleeve-shaped portion 6 in the example illustrated is made of a double bent sheet metal piece, whereby a plate-shaped portion 7 for the fastening is formed, by means which the sleeve-shaped portion is maintained in non-pivotable anchoring manner in the shielding unit 1. The plate is suitably bent in such a way that the sleeve-shaped portion 6 forms entirely closed jointless sleeve portions. In order further to improve the rigidity and compensate for the torsional strain at the point of fixation between the sleeve-shaped portion 6 and the shielding unit 1, a substantially U-shaped yoke 8 has been incorporated in said shielding unit 1, which yoke also forms part of a second hinge, in which it serves the purpose of axis 9.

The first mentioned hinge 3 is made with the sleeve-shaped portion 6 divided into three sleeve portions 11,12, through which the shaft part 4 in mounted condition is threaded. In order to facilitate this, all sleeve portions 11,12 are designed with conically widening ens 13, while the shaft portion 4 at one end has a conically narrowing portion 14. Moreover, the sleeve-portions are provided with a chute-shaped space 15, which is intended to receive a projection 10, which protrudes sideways from the shaft portion 4 (FIG. 5) during the introduction of the rod-shaped part through the sleeve-portions 11, 12. This projection 10 in mounted condition by striking against anyone of the conical ends 13 is intended to keep together the hinge 3, so that the sleeve-shaped part 6 cannot unintentionally slide off the part 4. The projection 10 occupies such an angular position that it is not passed by the expanded portion 15 in connection with a movement within the normal range of movement of the sunshade.

According to the present invention the necessary friction mentioned in the introductory part is provided by a radial displacement being brought about between the portions of the sleeve-shaped part 6, as is evident from FIG. 2. In the example illustrated the middle sleeve-portion 12 has been given a radial displacement 16, whereby a pinching action in the abutting surfaces between the shaft portion 4 and the inner walls of the sleeve-portions 11, 12 results, which without difficulty can be adjusted in such a way that the desired friction is obtained with narrow tolerance. A certain resilience contributes to the continuous and practically non-decreasing friction, which resilience is obtained in the sleeve-shaped part, and against the action of which the shaft part 4 thus tends to keep all three sleeve-portions 11, 12 substantially in the pivoting axis of the hinge. In order to secure these features, it is further essential to have the two recesses 17, which separate the sleeve-portions 11, 12 and provide a suitable arm of moment to the spring force.

A suspension member 25, of which an example is illustrated in FIG. 3, belongs to the above mentioned second hinge and is rigidly connected to the vehicle. The axis 9 can be suspended in this member, whereby the sunshade can be pivoted round an axis with a fixed direction. The axis 9 of the sunshade, however, can be lifted off from the member 25 and be pivoted out to any desired position by pivoting round a hinge at the end 5 of the rod-shaped part 4.

In order to provide a predetermined fixation of the sunshade in an out of the way position advantageously the hinge 3 can be designed as is shown by way of example in the FIGS. 4 and 5. In said exaple the shaft portion 4 of the hinge 3 is designed with a chamfered portion 18 located right in front of the sleeve-portion 12, which is designed in such a manner that it tends to be displaced in radial direction relative to the other sleeve-portions 11 and with an angular position on the shaft part 4, which is suitably chosen relative to the pivoting position of the sunshade. A fixation is obtained with the shaft portion 4 in the pivoting position illustrated in FIG. 4 by the middle sleeve-portion 12 in said position getting its radial displacement and in this position in a resilient manner is pressed against the chamfered portion 18 limited by an edge 19. In connection with a pivoting of the sunshine and consequently the shaft portion 4 a greater torque is hereby required on the shaft portion 4, when the pivoting is starting from the position illustrated than in the other pivoting positions, as the sleeve-portion 12 must be displaced against bias of the spring to a position substantially coxial to the other sleeve-portions.

The variant of the hinge 3, illustrated in the FIGS. 6 and 7, can by way of example substantially exhibit the design with a sleeve-shaped part 6 and a rod-shaped axis-portion 20 described above with reference to the FIGS. 1 and 2.

The sleeve-shaped part 6 is rigidly anchored to the shielding unit 1 of the sunshade, by way of example in the manner illustrated in FIG. 1, and with its three sleve-portions 11, 12 via an inner sleeve 22 surrounds the rod-shaped shaft portion 20, one end of which is intended to be attached to the vehicle and by way of example exhibits the appearance shown in FIG. 1. The middle sleeve-portion 12 also in this example is designed in such a manner that it tends to be radially displaced relative to the other sleeve-portions 11. The shaft portion 20 extends, however, with its other end 21 a distance past the sleeve-shaped part 6 in order to permit an axial displacement of the sleeve-shaped part 6 and consequently the shielding unit 1 along the shaft portion 20.

For this purpose the inner sleeve 22 mentioned above is placed between the sleeve portions 11, 12 and the shaft portion 21, said inner sleeve 22 being pivotable but axially non-displaceable relative to the sleeve-portions 11, 12. On the other hand the inner sleeve 22 is axially displaceable but non-pivotable relative to the axis-portion 20 between two end positions. The inner sleeve 22 namely has an axially extending slit 23, in which a pin 24 projecting from the shaft portion 21 is movable, the movement of said pin being longitudinally limited by end stops 25. By this arrangement it is thus made possible that the sunshade in addition to the normal pivoting capacity also can be displaced sideways, which considerably increases the shielding possibilities, for example, when the sunshade is pivoted towards the side windows, where a displacement is backwards direction is desirable.

The invention is not limited to the examples described above. By way of example the sunshade according to the invention can be designed without the U-shaped yoke 8 as well as said second hinge illustrated in FIG. 1. The cross-sectional form of the sleeve-shaped parts can deviate from a circular shape and by way of example be oval or exhibit a drop shape, whereby for one part an additional improved friction is obtained and for another part in a simple manner the above mentioned chute shaped space 15 for the projection is obtained.

I claim:

1. A sunshade intended for use in motor vehicles, comprising: a light-shielding unit, a hinge for pivotally suspending said unit in a fixed portion of the vehicle, said hinge comprisng a rod-shaped shaft part and a sleeve-shaped part, one of said parts being anchored to said fixed portion and the other being rigidly connected with the shielding unit, said two parts being pivotally connected to each other with a suitably chosen friction, said sleeve-shaped part having at least two sleeve portions, an anchoring plate connecting said sleeve portions to each other at a distance from the pivoting axis of the hinge, at least one of the sleeve portions being biased relative to the other of the sleeve portions by a bias force so that said one sleeve portion tends to take a radially displaced position relative to the pivoting axis of the hinge, said anchoring plate having a recess between the sleeve portions extending a predetermined distance from said pivoting axis, said distance determining the moment arm of said bias force.

2. A sunshade according to claim 1, wherein said shaft part has a shaft portion cooperating with said sleeve-portion of the sleeve-shaped part and arranged to permit said radial displacement of said sleeve-portion, said shaft part comprising a recess.

3. A sunshade according to claim 2, wherein said recess is a chamfer.

4. A sunshade according to claim 1, comprising an inner sleeve located between the shaft part and the sleeve-shaped part, said inner sleeve being pivotally but not axially displaceable relative to the sleeve-shaped and axially displaceable but non-pivotable relative to the shaft part, said inner sleeve having a longitudinal slot, and a pin projecting from the shaft part and movable in said slot.

* * * * *